United States Patent

Hall

[11] Patent Number: 5,944,973
[45] Date of Patent: Aug. 31, 1999

[54] WATER TREATMENT DEVICE

[75] Inventor: Charles Edward Hall, West Chester, Ohio

[73] Assignee: Watertek International, Ltd., Cincinnati, Ohio

[21] Appl. No.: 08/938,809

[22] Filed: Sep. 26, 1997

[51] Int. Cl.[6] .................................................... A47J 31/00
[52] U.S. Cl. .............................. 204/664; 99/286; 210/222
[58] Field of Search .................................... 204/557, 664; 210/222, 223, 695; 99/286

[56] References Cited

U.S. PATENT DOCUMENTS

| | | | |
|---|---|---|---|
| 2,652,925 | 9/1953 | Vermeiren | 210/222 |
| 2,939,830 | 6/1960 | Green et al. | 204/248 |
| 3,936,364 | 2/1976 | Middle | 426/66 |
| 4,065,386 | 12/1977 | Rigby | 210/695 |
| 4,153,559 | 5/1979 | Sanderson | 210/222 |
| 4,265,754 | 5/1981 | Menold | 204/664 |
| 4,836,932 | 6/1989 | Walsh | 210/695 |
| 5,113,751 | 5/1992 | Holcomb et al. | 99/286 |
| 5,165,952 | 11/1992 | Solomon et al. | 427/2.25 |
| 5,522,992 | 6/1996 | Cervantes | 210/542 |

OTHER PUBLICATIONS

Klaus J. Krohenberg, Magnetic Water Treatment De-Mystified, *Magnets*, pp. 6–15 and 27, Aug. 1977.

*Primary Examiner*—Kathryn Gorgos
*Assistant Examiner*—William T. Leader
*Attorney, Agent, or Firm*—Nikaido, Marmelstein, Murray & Oram LLP

[57] ABSTRACT

There are provided water treatment devices which include a hollow member comprising copper, an inside layer comprising silver on the inside surface of the hollow member, an outside layer comprising silver on the outside surface of the hollow member, a first end cap attached to a first end of the hollow member, a second end cap attached to a second end of the hollow member, the first and second end caps each having an outer surface layer comprising silver, a magnet positioned within an interior space inside the hollow member, and a mixture comprising at least two materials selected from the group consisting of powdered iron, powdered manganese, powdered zinc, powdered copper, powdered graphite, cellulose and propylene glycol positioned within the interior space. In addition, there are provided methods of making water treatment devices, and methods of treating water.

10 Claims, 1 Drawing Sheet

WATER TREATMENT DEVICE

BACKGROUND OF THE INVENTION

1. Field of the Invention

The present invention relates to a water treatment device. There is an ongoing need for more effective devices for the treatment of water which are environmentally safe, and which, when placed in water, will prevent or reduce the formation of scale in water pipes carrying the water or in water vessels, water treatment equipment, etc. There is also an ongoing need for water treatment devices which can neutralize the pH of the water, and treat for algae and/or bacteria in the water. Also, there is an ongoing need for such a device which can improve the overall quality of the taste and smell of the water.

2. Description of Related Art

U.S. Pat. No. 2,652,925 discloses a magnetic treatment device for liquids. Referring to FIG. 1, a device according to this patent includes a pipe 1, inside of which is disposed a part 2 of high magnetic permeability, maintained by a number of elements 3 made from a non-magnetic material. The pipe 1 is surrounded by a number of solenoids 4 which can be supplied with alternating current or direct current. The device shown in FIGS. 3 and 4 approximates the device according to FIGS. 1 and 2, but the solenoids are replaced by magnets of annular shape.

U.S. Pat. No. 2,939,830 discloses a water conditioner. An object of the patent is to provide an electrically operated water conditioner which will accelerate ions in the water and cause them to strike the walls of the pipe and other metallic objects so as to cause the positively charged ions to strike free electrons to neutralize the charge on the ion. The patent discloses, in FIGS. 1 and 2, a water conditioner 2 which includes a length of pipe 3, preferably of steel or other ferrous material and a conduit pipe 12 which carries electrical wire 13 from a power source to a conduit box 7 and then to coils 14 which encircle with center core 15 which connects north pole 16 and south pole 17 of electro-magnet 18. According to the patent, by using alternating current in the coil 14, a very agitated and vibrating flux 25 is provided in gap 23 and accelerates the bombardment of the ions (and anions) in the water as the water passes through the gap 23. The patent also discloses a direct current embodiment in FIG. 4.

U.S. Pat. No. 4,065,386 discloses a method of treating water to control or eliminate algae and bacterial growth, wherein the water is passed through a magnetic field. FIG. 1 shows a unit 4 which includes a central chamber 5 and an inlet 6 and outlet 7 each of which is screw threaded. A magnetic unit 10 is composed of three permanent magnets 11 mounted on a plastic shaft 12 and spaced by spacers 13.

U.S. Pat. No. 4,153,559 discloses a water treatment device which comprises an outer casing 10 of a non-magnetic material such as copper and a pair of substantially identical fluid fittings 12 and 14 also of a non-magnetic material such as brass. The device includes a tubular intermediate casing 32 of a ferromagnetic material such as galvanized iron or steel, and positioned within the casing 32 is a tube 34 of non-magnetic material, such as copper.

U.S. Pat. No. 4,265,754 discloses a water treating apparatus 10 attached to the exterior surface to a water pipe 12. FIG. 2 illustrates a water treatment device 10, which includes a magnetic structure 18 which operates to produce a desired magnetic field in proximity to the pipe 12.

U.S. Pat. No. 5,522,992 discloses a means for treating water to prevent corrosion for use in cooling towers and other heat exchange means. The device comprises a sealed container including a mixture of magnetite, a weak acid, and an inert filler. In use, the container is suspended completely submerged in the solution to be treated. FIG. 2 shows a treatment device which includes a cylindrical sealed container 14 generally made of brass, aluminum, copper, zinc, silver, manganese, iron, tin, or combinations or alloys thereof. The container 14 may be coated with a second material such as silver, gold, palladium, platinum and the like. Container 14 includes a chemical mixture 16, in which the primary ingredients are magnetite, a weak organic acid and an inert filler.

None of the above-described devices satisfactorily meets the current needs for water treatment devices.

SUMMARY OF THE INVENTION

In accordance with the present invention, there is provided a water treatment device which provides high energy output and excellent life expectancy, and which excels in the treatment of water. According to the present invention, there is provided a hollow member comprising copper and having an inside surface and an outside surface, a first end and a second end, (2) an inside layer comprising silver on the inside surface of the hollow member, (3) an outside layer comprising silver on the outside surface of the hollow member, (4) first and second end caps attached to the first and second ends of the hollow member, respectively, the end caps each having an outer surface layer comprising silver, (5) a magnet positioned within an interior space inside the hollow member (the interior space being defined by the first and second end caps and the inside layer), and (7) a mixture containing at least two materials selected from the group consisting of powdered iron, powdered manganese, powdered zinc, powdered copper, powdered graphite, cellulose and propylene glycol, the mixture being positioned within the interior space.

The invention may be more fully understood with reference to the accompanying drawings and the following description of the embodiments shown in those drawings. The invention is not limited to the exemplary embodiments and should be recognized as contemplating all modifications within the skill of an ordinary artisan.

BRIEF DESCRIPTION OF THE DRAWING FIGURES

DETAILED DESCRIPTION OF THE PREFERRED EMBODIMENTS

Figure 1:
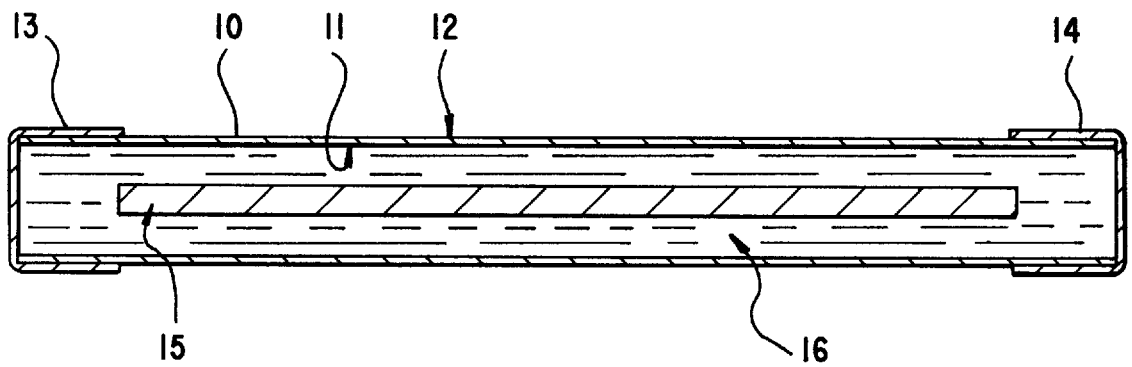
FIG. 1 is a sectional view of a preferred embodiment of a water treatment device in accordance with the present invention.

An embodiment of a water treatment device according to the present invention is shown in FIG. 1. The water treatment device shown in FIG. 1 includes a hollow member in the shape of a tube 10 having a circular cross-section and being formed of copper, the tube having an inside layer 11 formed of silver positioned on the inner surface of the hollow tube 10, and an outside layer 12 formed of silver positioned on the outer surface of the hollow tube 10. First and second silver-plated end caps 13 and 14 are provided on the two ends of the hollow tube 10, and the end caps are brazed to the ends of the tube. A permanent magnet 15 is positioned in the interior space of the hollow tube 10. A mixture 16 containing at least two materials selected from the group consisting of powdered iron, powdered manganese, powdered zinc, powdered copper, powdered graphite, cellulose and propylene glycol, each in amounts in the range of from 20 to 80 percent by volume, is packed in the interior space inside the hollow member around the magnet 15.

In accordance with the present invention, the hollow member can be of any suitable cross-sectional shape, and is most preferably of a generally circular cross-section, although a multitude of possible cross-sections for the hollow member can readily be envisioned, e.g., a generally square cross-section, generally rectangular cross-section, generally oval cross-section, etc. The copper tube can be of any of a variety of diameters and lengths.

The hollow member has, on its inside surface, an inside layer formed of silver, and, on its outside surface, an outside layer formed of silver. The inside layer of silver and the outside layer of silver are preferably formed by silver-plating on both the inside and outside surfaces of the hollow member.

The outer surfaces of the end caps are preferably silver-plated. The ends caps are preferably attached to the ends of the hollow member using a silver-alloyed braze.

The permanent magnet may generally be any suitable permanent magnet, e.g., an aluminum-nickel-cobalt magnet, such as Alnico #5.

The material positioned in the interior space of the hollow member together with the magnet includes at least two materials selected from the following list in the amounts indicated (when present):

| MATERIAL | VOLUME |
| --- | --- |
| Powdered Iron | 20–80% |
| Powdered Manganese | 20–80% |
| Powdered Zinc | 20–80% |
| Powdered Copper | 20–80% |
| Powdered Graphite | 20–80% |
| Cellulose | 20–80% |
| Propylene Glycol | 20–80%. |

In making the mixture, the two or more materials selected from the above list are preferably placed into a mixer and blended.

In use, one or more water treatment devices of the present invention are placed into water and protected from either grounding out or coming into contact with other water treatment devices and shorting out. The water treatment device thus placed in water will emit a small electrical charge into the water, the charge being in the millivolt, milliamp range. This charge has a specific effect on the suspended and dissolved solids in the water and causes the molecules to ionize. By introducing an electrical charge into the water, the charge causes the suspended and dissolved solids to ionize into smaller particles. In ionizing the molecule, a change in polarity is observed in the water. Whereas water normally carries a positive potential, the vessel holding the water will have a negative potential. Because dissimilar potentials attract each other, there would be a tendency for the solids to plate the walls of the container, thus causing scale to form. By ionizing the molecules and changing the positive potential of the solids to a negative potential, the solids are now repelled by the negative charge of the vessel walls. The solids are thus held in suspension in a hyper-fine state and pass harmlessly through the system without plating. If the water becomes saturated, the excessive solids will precipitate to the bottom.

The water treatment device of the present invention thus provides an environmentally safe method of treating water. There are no hazardous materials present in the body of the device or in the internal mixture that would be harmful, should the device rupture and spill its contents into the water which is being treated. As mentioned above, the mixture inside the hollow member consists of a mixture of two or more materials selected from powdered iron, powdered manganese, powdered zinc, powdered copper, powdered graphite, cellulose and propylene glycol. Should the device rupture, the heavy metals would settle to the bottom of the container, while the balance of the material would pass through the system. These materials are of such small proportions that, if taken internally, they would not cause any harmful effects.

The silver plating of the internal and external surfaces of the device according to the present invention provides several valuable properties. Silver ions are detrimental to a wide range of algae and bacteria. Secondly, silver is an excellent electrical conductor, and it is crucial in the total transfer of the energy generated by the mixture. Furthermore, silver does not oxidize as rapidly as or to the extent that copper will.

The presence of the magnet in the core of the mixture increases the negative output of the device, and sustains the negative output of the device. The formulation of the mixture in accordance with the present invention, in conjunction with the use of the permanent magnet, provides the device of the present invention with the valuable properties described herein.

The water treatment device of the present invention is suitable for use in a variety of applications involving various extreme conditions. For example, water treatment devices of the present invention can be placed into plastic housings for use in the commercial and industrial market. Such units can be used for a wide variety of purposes, e.g., shower heads, etc. in home applications, coffee brewers, etc., in commercial applications, and in cooling towers, boilers, etc., in industrial applications.

Figure 2:
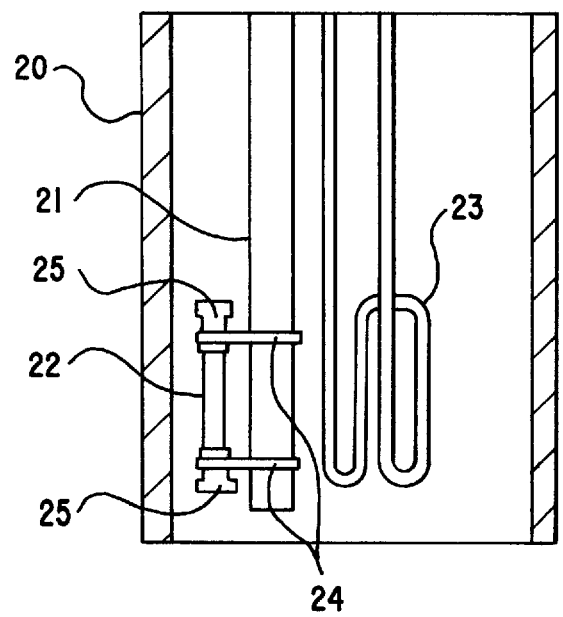
FIG. 2 is a sectional view of a coffee brewer in accordance with the present invention.

As indicated above, a wide variety of devices are within the scope of the present invention. For instance, FIG. 2 depicts a coffee brewer according to the present invention. This coffee brewer brews coffee using a "pour over" technique, a coffee brweing technique which is well known in the coffee brewing art. Of course, those of skill in the art could readily adapt other types of coffee brewers so as to employ the unique and advantageous aspects of the water treatment device of the present invention. The "pour over" coffee brewer includes a water heating tank 20, in which is positioned a water fill tube 21, through which water is supplied from outside the water heating tank 20 into the interior of the water heating tank 20. Also positioned within the water heating tank 20 is a water treatment device 22 according to the present invention. In the embodiment depicted in FIG. 2, the water treatment device 22 is attached to the water fill tube 21 by a pair of stainless steel bands 24, and those of skill in the art will readily appreciate that the water treatment device 22 can be secured within the water heating tank 20 in numerous other ways. The coffee brewer also includes a heating element 23, also positioned inside the water heating tank 20. In use, water is supplied to the interior of the water heating tank 20 through the water fill tube 21, and is heated by the heating element 23. In the embodiment shown in FIG. 2, the water treatment device 22 is insulated from ground by ceramic holders 25, around which the stainless steel bands 24 are attached. Hot water rises and exits through the top of the water heating tank 20, and is fed into the top of a basket (not shown) in which is positioned a coffee filter (not shown) and ground coffee (not shown), such that the hot water contacts the ground coffee, thereby brewing liquid coffee. The brewed liquid coffee drains through the bottom of the basket into a container (not shown), from which the brewed liquid coffee can be served. During the time that the water remains in the water heating tank, the water is treated by the water treatment device 22 in accordance with the present invention, as described above. The water treatment system described above is easily installed and requires little or no maintenance. As water is poured into the coffee brewer and comes into contact with the water treatment device 22, the water is immediately treated, thereby reducing or eliminating lime or scale buildup on the heating element 23 or on the walls of the water heating tank 20. In addition, the water treatment device 22 reduces or eliminates chlorine odor which otherwise affects the taste of the brewed liquid coffee. When the coffee machine is not being used, any water sitting in the water heating tank is continually treated, thereby protecting the tank and maintaining a lime-free and scale-free (or lime-reduced and scale-reduced) coffee machine.

In making the water treatment device of the present invention, preferably, one end cap is attached to one end of the hollow member and brazed with a silver alloy, thus sealing that end of the tube. The tube is then packed firmly with a mixture as described above. Then, a permanent magnet is inserted into the core of the mixture. Finally, the second end cap is silver brazed to the open end of the hollow member.

Although the water treatment devices and methods of making them in accordance with the present invention have been described in connection with preferred embodiments, it will be appreciated by those skilled in the art that modifications not specifically described may be made without departing from the spirit and scope of the invention defined in the following claims.

What is claimed is:

1. A water treatment device, comprising:

a hollow member having an inside surface, an outside surface, a first end and a second end, said hollow member comprising copper;

an inside layer comprising silver on said inside surface of said hollow member;

an outside layer comprising silver on said outside surface of said hollow member;

a first end cap attached to said first end of said hollow member, said first end cap having an outer surface layer comprising silver;

a second end cap attached to said second end of said hollow member, said second end cap having an outer surface layer comprising silver;

said first and second end caps and said inside layer defining an interior space inside said hollow member;

a magnet positioned within said interior space; and a mixture comprising at least two materials selected from the group consisting of powdered iron, powdered manganese, powdered zinc, powdered copper, powdered graphite, cellulose and propylene glycol positioned within said interior space.

2. A water treatment device as recited in claim 1, wherein said hollow member has a circular cross-section.

3. A water treatment device as recited in claim 1, wherein said first end cap is brazed to said first end of said hollow member, and said second end cap is brazed to said second end of said hollow member.

4. A water treatment device as recited in claim 1, wherein said magnet is an aluminum—nickel—cobalt magnet.

5. A coffee brewing apparatus, comprising:

a water heating tank defining a tank interior;

a water fill tube positioned within said tank interior;

a heating element positioned within said tank interior;

a hollow member having an inside surface, an outside surface, a first end and a second end, said hollow member comprising copper and being positioned within said tank interior;

an inside layer comprising silver on said inside surface of said hollow member;

an outside layer comprising silver on said outside surface of said hollow member;

a first end cap attached to said first end of said hollow member, said first end cap having an outer surface layer comprising silver;

a second end cap attached to said second end of said hollow member, said second end cap having an outer surface layer comprising silver;

said first and second end caps and said inside layer defining an interior space inside said hollow member;

a magnet positioned within said interior space; and a mixture comprising at least two materials selected from the group consisting of powdered iron, powdered manganese, powdered zinc, powdered copper, powdered graphite, cellulose and propylene glycol positioned within said interior space.

6. A coffee brewing apparatus, comprising:

a water heating tank defining a tank interior;

means for supplying water to said tank interior;

means for heating said water in said tank interior;

a hollow member having an inside surface, an outside surface, a first end and a second end, said hollow member comprising copper and being positioned within said tank interior;

an inside layer comprising silver on said inside surface of said hollow member;

an outside layer comprising silver on said outside surface of said hollow member;

a first end cap attached to said first end of said hollow member, said first end cap having an outer surface layer comprising silver;

a second end cap attached to said second end of said hollow member, said second end cap having an outer surface layer comprising silver;

said first and second end caps and said inside layer defining an interior space inside said hollow member;

a magnet positioned within said interior space; and a mixture comprising at least two materials selected from the group consisting of powdered iron, powdered manganese, powdered zinc, powdered copper, powdered graphite, cellulose and propylene glycol positioned within said interior space.

7. A method of treating water, comprising placing into water a water treatment device comprising a hollow member having an inside surface, an outside surface, a first end and a second end, said hollow member comprising copper; an inside layer comprising silver on said inside surface of said hollow member; an outside layer comprising silver on said outside surface of said hollow member; a first end cap attached to said first end of said hollow member, said first end cap having an outer surface layer comprising silver; a second end cap attached to said second end of said hollow member, said second end cap having an outer surface layer comprising silver; said first and second end caps and said inside layer defining an interior space inside said hollow member; a magnet positioned within said interior space; and a mixture comprising at least two materials selected from the group consisting of powdered iron, powdered manganese, powdered zinc, powdered copper, powdered graphite, cellulose and propylene glycol positioned within said interior space.

8. A method of treating water as recited in claim 7, wherein wherein said hollow member has a circular cross-section.

9. A method of treating water as recited in claim 7, wherein said first end cap is brazed to said first end of said hollow member, and said second end cap is brazed to said second end of said hollow member.

10. A method of treating water as recited in claim 7, wherein said magnet is an aluminum—nickel—cobalt magnet.

* * * * *